United States Patent
Van Hout et al.

(10) Patent No.: US 6,204,617 B1
(45) Date of Patent: Mar. 20, 2001

(54) DEVICE FOR THE DETECTION OF AN ANGLE OF ROTATION OF A BRUSHLESS MULTI-PHASE D.C. MOTOR

(75) Inventors: Henricus M. Van Hout; Catharinus T. Galema, both of Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/363,351

(22) Filed: Jul. 29, 1999

(30) Foreign Application Priority Data

Jul. 31, 1998 (EP) .................................................. 98202596

(51) Int. Cl.[7] .................................................. H02K 23/00
(52) U.S. Cl. .......................... 318/254; 318/439; 318/138; 318/778; 318/702; 318/723
(58) Field of Search .................................. 318/138, 254, 318/439, 778, 702, 723

(56) References Cited

U.S. PATENT DOCUMENTS

| | | | |
|---|---|---|---|
| 5,117,165 | 5/1992 | Cassat et al. ........................ | 318/254 |
| 5,530,326 | 6/1996 | Galvin et al. ........................ | 318/254 |
| 5,652,525 | * 7/1997 | Mullin et al. ........................ | 318/490 |

* cited by examiner

Primary Examiner—Karen Masih
(74) Attorney, Agent, or Firm—Bernard Franzblau

(57) ABSTRACT

A device which detects the angle of rotation of a rotor with respect to a stator of a brushless multi-phase d.c. motor. The rotor comprises a permanent magnet and the stator comprises a plurality of electrical windings. Electric drive signals are applied to the windings in order to drive the rotor. The device includes a drive circuit for applying pulse-shaped electric test signals to the windings while the rotor does not rotate. A measurement circuit detects flyback pulses generated by the motor in response to the test signals. A processing unit processes the durations of the detected flyback pulses in combination in order to determine the angle of rotation. On the basis of the angle of rotation thus determined, the motor can be started such that the rotor is set into rotation in a predetermined direction of rotation.

21 Claims, 7 Drawing Sheets

| F | from | to | FC | A | B | C |
|---|------|----|----|----|----|----|
| 1 | A | B | C | Pa | Pa | Pv |
| 2 | A | C | B | Pa | Pv | Pa |
| 3 | B | C | A | Pv | Pa | Pa |
| 4 | B | A | C | Pa | Pa | Pv |
| 5 | C | A | B | Pa | Pv | Pa |
| 6 | C | B | A | Pv | Pa | Pa |

DEVICE FOR THE DETECTION OF AN ANGLE OF ROTATION OF A BRUSHLESS MULTI-PHASE D.C. MOTOR

BACKGROUND OF THE INVENTION

This invention relates to a device for detecting an angle of rotation of a rotor with respect to a stator of a brushless multi-phase d.c. motor, the rotor comprising a permanent magnet and the stator comprising a plurality of electrical windings to which, in operation, electric drive signals are applied for driving the rotor, the device having drive means for applying electric test pulses to the windings while the rotor does not rotate.

The invention also relates to a driving system comprising a multi-phase d.c. motor and a device for the detection of the angle of rotation. The invention further relates to a disk drive and a tape streamer including a driving system in accordance with the invention.

Such a device is known inter alia from U.S. Pat. No. 5,117,165. In this known device current pulses of short duration and of mutually opposite polarities are applied to each winding of the stator during standstill of the motor. Moreover, the build-up of the current in the respective winding is measured by means of a series resistor, which acts as a current-voltage converter. In this way, 2n voltages are measured in the case of a n-phase d.c. motor. It has been found that each of the measured currents depends on the position of the rotor with respect to the stator windings. With the aid of the 2n measured currents through the windings the position of the rotor with respect to the stator windings can be determined with an accuracy of 180°/n. Subsequently, information about the angle of rotation of the rotor with respect to the stator can be used, in a manner known per se, to start the motor in such a way that it is directly set into rotation in a predetermined direction. This is very important in the case where a multi-phase d.c. motor is used in disk drives of a certain type in order to preclude damage to the read and write heads. When multi-phase d.c. motors are used in tape streamers this is important for an optimum use of the storage capacity of a tape.

A drawback of the known device is that the build-up of currents in the windings is monitored by means of a current-voltage converter arranged in series with the respective windings. As a result of this, a comparatively large amount of power is dissipated in the current-voltage converter.

SUMMARY OF THE INVENTION

It is an object of the invention to provide a solution in order to overcome this drawback. To this end, the device in accordance with the invention is characterized in that the device further comprises a measurement circuit for detecting the flyback pulses generated by the motor in response to the test pulses and a processing unit which processes the durations of the detected flyback pulses in combination in order to determine said angle of rotation.

The detection of the flyback pulses can be effected without a current-voltage converter being arranged in series with the respective windings. It appears that the width of the flyback pulses, i.e. the duration of the flyback pulses, depends on the self-induction of the respective windings. In turn, the self-induction of a winding depends on the angle of rotation of the rotor with respect to the respective winding. As a result of this, said angle of rotation can be determined with the aid of the measured durations of the detected flyback pulses. In contradistinction to the situation in the known device, the detection of the flyback pulses implies that a measurement is carried out at an instant at which the test pulse is not present. In other words, in accordance with the invention the breakdown of the self-induction of a winding is measured, while in the known device the build-up of the self-induction in a winding is measured.

Another advantage of the device in accordance with the invention is that, in view of the nature of the signals to be processed by it, the processing unit can be very simple without use being made of a microprocessor.

In particular, it is determined whether each winding has a north or south orientation with respect to the magnetic stator. This information makes it possible to determine the angle of rotation of the rotor with respect to the stator, i.e. with respect to the stator windings.

In particular, the drive means are also adapted to recurrently apply drive signals to the windings of the motor in a given sequence in order to rotate the rotor.

Thus, the drive means preferably have a dual function. They can be used both for controlling the rotation of the motor and for determining the angle of rotation of the rotor with respect to the stator during standstill of the motor.

In accordance with a further embodiment of the invention the device is characterized in that the drive means include a plurality of switching elements for the generation of the test pulses and the drive signals, the drive means also including said measurement circuit for monitoring, during the period in which the drive means generate the drive signals, the voltages across the switching elements of the drive means when these switching elements are in an open state.

This means that in this case the measurement circuit also has a dual function. During rotation of the motor the measurement circuit is used for monitoring the voltages across the switching elements and during standstill of the motor the measurement circuit is also used for determining the angular position of the rotor with respect to the stator.

In particular, the drive means are adapted to apply test pulses to each of the windings. This makes it possible to determine the angle of rotation with an optimum accuracy. Preferably, two test pulses of mutually different polarities are applied to each of the windings. In the case of an n-phase d.c. motor, which is a d.c. motor having at least two windings which comprise a different motor phase during use, the angle of rotation can then be determined with an accuracy of 180°/n.

In a very practical embodiment the device is adapted to a motor having three windings (n=3) arranged with a mutually different phase with respect to one another, the device for determining the angle of rotation performing, in operation, a measurement process comprising three cycles in order to detect six flyback pulses, a first test pulse of a first polarity being applied to a first pair of windings in a first cycle; a flyback pulse generated in response to the first test pulse being detected; a second test pulse of a second polarity opposite to the first polarity being applied to the first pair of windings; and a flyback pulse generated in response to the second test pulse being detected; the first cycle being repeated in a second cycle and in a third cycle for a second pair of windings and a third pair of windings, respectively, the first, the second and the third pair of windings being different from one another.

The processing unit, in particular, can measure the difference in duration of two flyback pulses measured in each step. This implies that eventually only three differences in duration are detected. These differences can be determined simply by means of an up-down counter. The up-down counter counts the pulses of a clock during the presence of a flyback pulse in response to the first test pulse and subsequently counts down the pulses of the clock signal during the presence of a flyback pulse in response to the second test pulse. In this way the counter eventually indicates the difference in duration between said two flyback pulses. The three differences in duration thus detected can be applied directly to the drive means in order to determine the condition in which the drive means can be started so as to cause the motor to rotate, namely in such a manner that the motor starts to rotate directly in a predetermined position.

Thus, the processing unit can be realized very simply by means of an up/down counter, without the use of a microprocessor being required.

BRIEF DESCRIPTION OF THE DRAWINGS

The invention will now be described in more detail with reference to the drawings. In the drawings.

DESCRIPTION OF THE PREFERRED EMBODIMENTS

Figure 1:
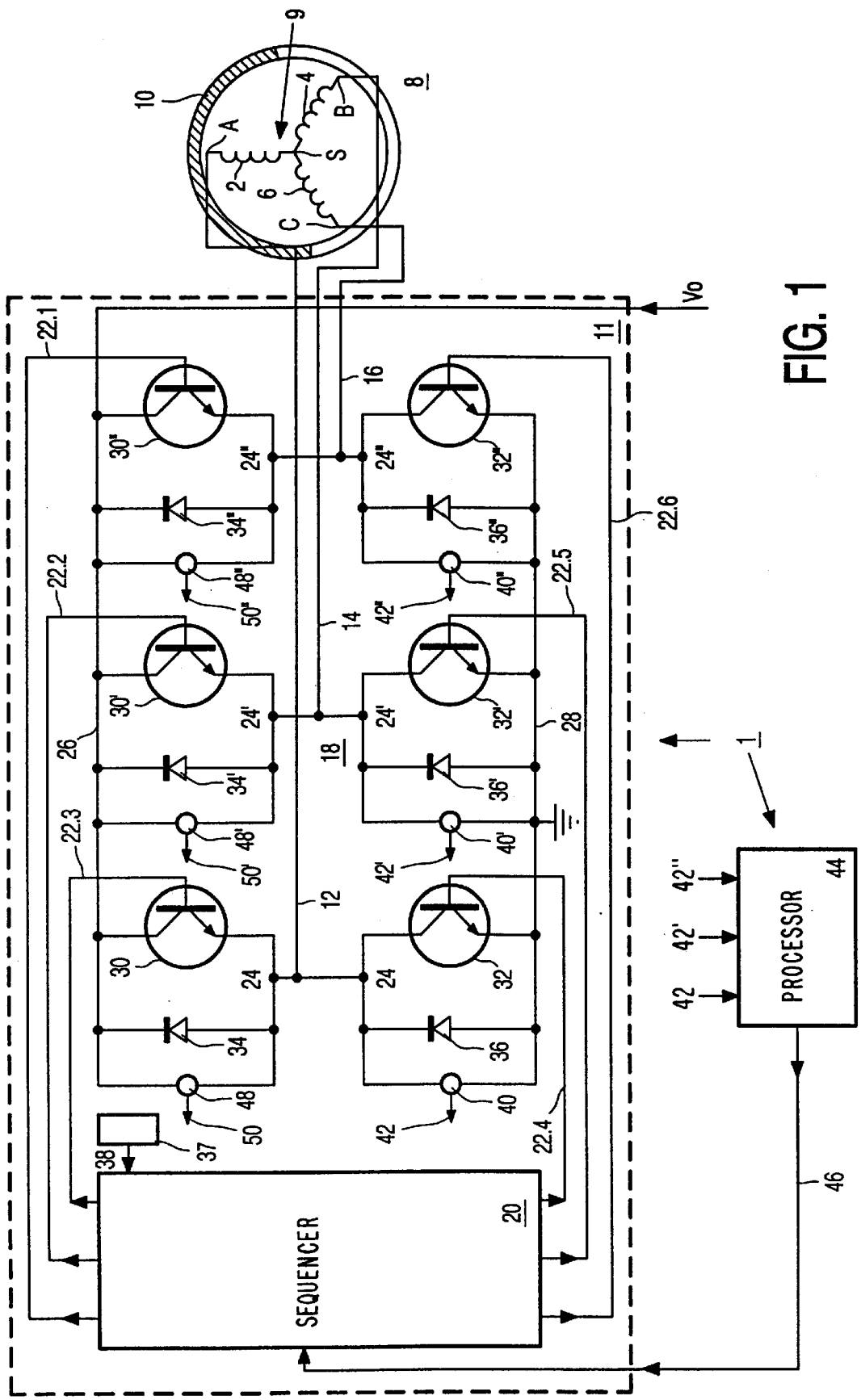
FIG. 1 shows a possible embodiment of a device in accordance with the invention.

The device shown in FIG. 1, for supplying drive signals, which comprise drive pulses, and test pulses to a three-phase brushless d.c. motor 8, bears the reference numeral 1. The windings 2, 4, 6 form part of the stator 9 of the motor. The motor 8 further has a rotor 10, which is shown diagrammatically in FIG. 1. The rotor 10 comprises a permanent magnet whose north pole is shown hatched. The south pole is shown without hatching.

The windings 2, 4, 6 of the stator of the motor 8 are recurrently supplied with drive signals in a given sequence, in such a manner that the magnetic rotor of the motor is set into rotation, at least one winding not being supplied with drive signals during given free periods. In the present example, the three windings are recurrently energized with drive signals in pairs with the remaining winding kept unenergized during a given free period.

The device 1 includes drive means 11 for applying the drive signals to the windings 2, 4, 6 of the motor 8 in the afore-mentioned manner. In the present example, the drive means 11 take the form of a multi-phase inverter 11. The drive signals generated by the multi-phase inverter 11 are applied to the windings 2, 4, 6 of the motor 8 via lines 12, 14, 16 in order to drive the motor. The multi-phase inverter 11 in the present example is a three-phase inverter because in the present example a three-phase d.c. motor is to be driven. In this example the multi-phase inverter 11 comprises a power supply circuit 18 and a sequencer 20. Via lines 22.1–22.6 the sequencer 20 drives the power supply circuit sequentially in such a manner that the power supply circuit 18 sequentially, i.e. in a given recurrent sequence, supplies drive signals to the windings 2, 4, 6 in order to drive the motor. The power supply circuit 18 consists of a conventional triple half H bridge. The power supply circuit 18 has three series-connected current paths 24, 24', 24", which are arranged between a supply line 26 and a zero potential 28. In the present example, a supply voltage $V_0$ is applied to the supply line 26, the zero potential line being connected to ground.

Each current path 24, 24', 24" is made up of two series-connected switching elements in the form of transistors 30, 32; 30', 32'; and 30", 32". The transistors 30, 30', 30", 32, 32', 32" may each comprise, for example, a FET known per se, or any other known switching element. Furthermore, each switching element 30, 30', 30", 32, 32', 32" has an associated flyback diode 34, 34', 34", 36, 36', 36", respectively. Each flyback diode is arranged in anti-parallel with the respective switching element. Each flyback diode can be a parasitic diode of the switching element with which it is arranged in parallel. The flyback diodes can drain flyback signals produced in a winding by a back emf voltage during a free period of this winding. The supply lines 12, 14, 16 are connected to the respective nodes A, B, C between the switching elements 30, 32; 30', 32'; and 30", 32".

Figures 2, 3:
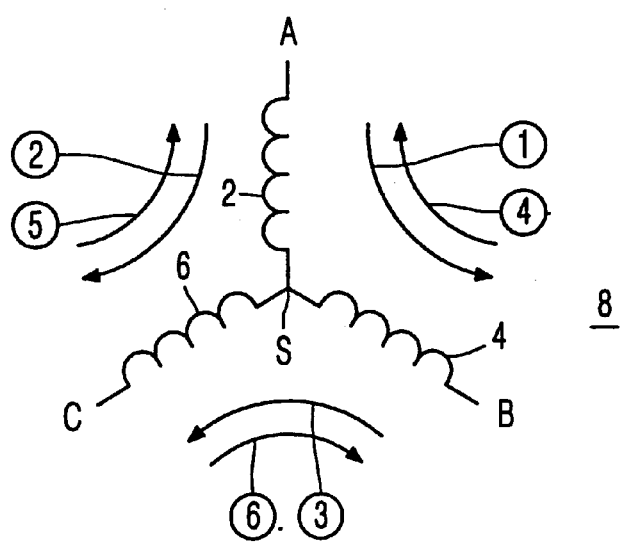
FIG. 2 is table to illustrate the operation of the device shown in FIG. 1, when the device drives a multi-phase d.c. motor.
FIG. 3 is a diagrammatic representation of drive signals successively applied to a motor by the device shown in FIG. 1.

The operation of the power supply circuit 18 will be described in more detail with reference to the Table of FIG. 2 and FIG. 3 which shows the motor once more. The terminals of the windings 2, 4, 6 are represented by the nodes A, B and C in FIG. 3 and correspond to the nodes A, B, C in FIGS. 1 and 2. When the motor rotates, generally speaking, one node (for example the node A) is connected to the supply line 26, another node (for example the node B) is connected to the zero potential line 28, and the last node (for example the node C) is kept floating. Thus, six different phases are conceivable. For example, in a first phase F the power supply circuit 18 is controlled via the line 22.3 in such a manner that the switching element 30 is turned on, as a result of which the node A is connected to the supply line 26. At the same time, in the first phase F the switching element 32' is controlled via the line 22.5 in such a manner that the node B is connected to the zero potential line 28. During the first phase F the other switching elements are controlled in such a manner that they are turned off. This has the result that in the first phase F a drive current starts to flow from the supply line 26 to the node A via the switching element 30, from the node A to the node B via the windings 2 and 4, and from the node B to the line 28 via the switching element 32'. The node C then remains floating. This first phase is illustrated in FIG. 2 and FIG. 3. The first row of FIG. 2 shows that a current flows from the node A to the node B, while the node C is kept floating. In FIG. 3 this current is shown as an arrow marked with an encircled reference numeral 1. In a second phase, in an entirely similar way, a current flows from the node A to the node C, while the node B is kept floating. The other phases, three to six, are shown accordingly in FIG. 2 and FIG. 3. Furthermore, a drive period $P_a$ can be defined as a period in which drive signals are applied to a winding of a motor. Moreover, a free period $P_v$ can be defined as a period in which no drive signal is applied to a winding. FIG. 3 also shows the drive period $P_a$ and the free period $P_v$. From this Figure it is apparent that drive signals are applied to the motor windings during given drive periods $P_a$, in such a manner that, in the present example, no drive signal is applied to one winding during drive periods $P_a$ of two windings. In addition, the beginning and the end of a free period coincide with a beginning or an end of a drive period, each drive period being twice as long as a free period. In each drive period a drive pulse whose duration is equal to the duration of the relevant drive period is applied to the relevant winding.

During the free period $P_v$, as already stated, one of the nodes A, B or C is kept floating. However, if for example the node C is kept floating in the first phase an induction voltage will be generated in the winding 6 owing to the rotation of the rotor of the motor. This induction voltage is available between the node C and the star point S of the three windings and is referred to hereinafter as the back emf signal. Likewise, a back emf signal is produced between the node B and the star point S in the second phase F and a back emf signal is produced between the node C and the star point S in the third phase F, etc.

The sequencer 20 is of a generally known type and, in the rhythm of a clock signal generated by a clock 37 and applied via the line 38, it generates control signals on the lines 22.1–22.6 which recurrently turn on the switching elements 30, 30', 30", 32, 32', 32" in the sequence given in the Table of FIG. 2. The sequencer 20 may comprise, for example, a shift register, known per se, which is cycled through six times in one electrical revolution of the motor.

Figure 4:
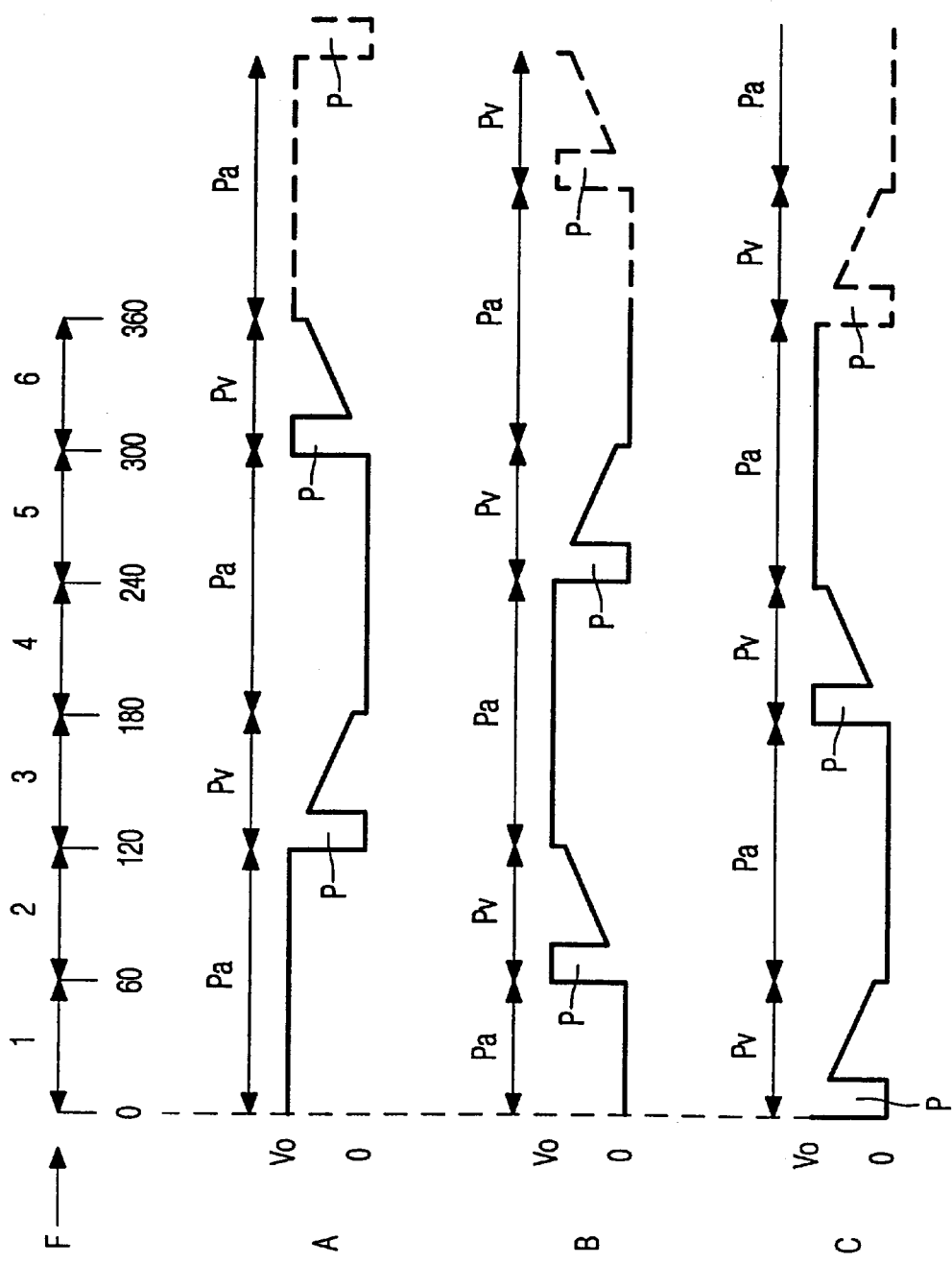
FIG. 4 shows a number of diagrams to illustrate the operation of the device shown in FIG. 1 when a motor is driven.

FIG. 4 shows in a first row marked F the six different phases which occur successively when the motor makes one complete electrical revolution. Rows A, B and C show the respective voltage as a function of time for the nodes A, B and C of the motor. This illustrates, for example, that during the first and the second phase the voltage of the node A is equal to the supply voltage $V_0$. During the third phase the node A is floating and the back emf signal will be produced in the winding 2. At the beginning of the fourth phase the voltage on the node A becomes equal to the voltage of the zero point because the node A is connected to the zero potential line 28. This situation is maintained in the fourth and the fifth phase. In the sixth phase the node A again becomes floating and again a back emf signal is generated. In the node B the same signal is generated as in the node A, the signal in the node B being 120° shifted in phase with respect to the signal in the node A. Likewise, a signal is generated in the node C which is 240° shifted in phase with respect to the signal in the node A.

The device 1 is also suitable for determining the angle of rotation of the rotor 10 with respect to the stator 9, which comprises the windings 2, 4, 6, when the motor does not rotate. In the present example the drive means 11 further include monitors 40, 40', 40", arranged in parallel with the switching elements 32, 32', 32". The monitors 40, 40', 40" are connecting to a processing unit 44 of the device via lines 42, 42', 42", respectively. The processing unit 44 has an output port connected to the drive means 11 via a line 46. In the present example, the line 46 is connected to the sequencer 20 of the drive means 11.

The device 1 further includes monitors 48, 48', 48" arranged in parallel with the switching elements 30, 30', 30", respectively. The voltages measured by these monitors are applied to the processing unit 44 via lines 50, 50', 50", respectively.

The device for detecting an angle of rotation of the rotor 10 with respect to the stator 9 operates as follows.

With the aid of the drive means 11 electrical test pulses are applied to the windings 2, 4, 6 while the rotor does not rotate. The width of the test pulses is so narrow that the rotor is not set into rotation under the influence of the test pulses.

The test pulses applied to the windings result in a flyback pulse being produced in the respective winding for each test pulse. This flyback pulse is a reaction to the self-inductance of the respective windings. The flyback pulses of each of the windings 2, 4, 6 can be detected by means of a measurement circuit, in the present example formed by the monitors 40, 40', 40". The detected flyback pulses are applied to the processing unit 44 via the respective lines 42, 42', 42". The processing unit 44 processes the durations of the flyback pulses in combination in order to determine said angle of rotation.

It is to be noted that the measurement circuit may also include the monitors 48, 48', 48". By means of these monitors it's also possible to determine the flyback pulses in each of the windings 2, 4, 6.

The monitors 40, 40', 40" and the monitors 48, 48', 48" are also used for monitoring the voltages across the switching elements when these switching elements are open and generate drive signals for causing the rotor to rotate, as described hereinbefore. Thus, the monitors are used both during rotation of the motor and for determining the position of the rotor with respect to the stator of the motor. This also applies to the switching elements of the drive means 11. In fact, the measurement circuit comprising monitors forms part of the drive means 11 which are used for driving the motor and for determining the angle of rotation of the rotor with respect to the stator during standstill of the motor.

A first further embodiment of the device shown in FIG. 1 will now be elucidated with reference to FIGS. 5, 6, 7 and 8.

Figure 8:
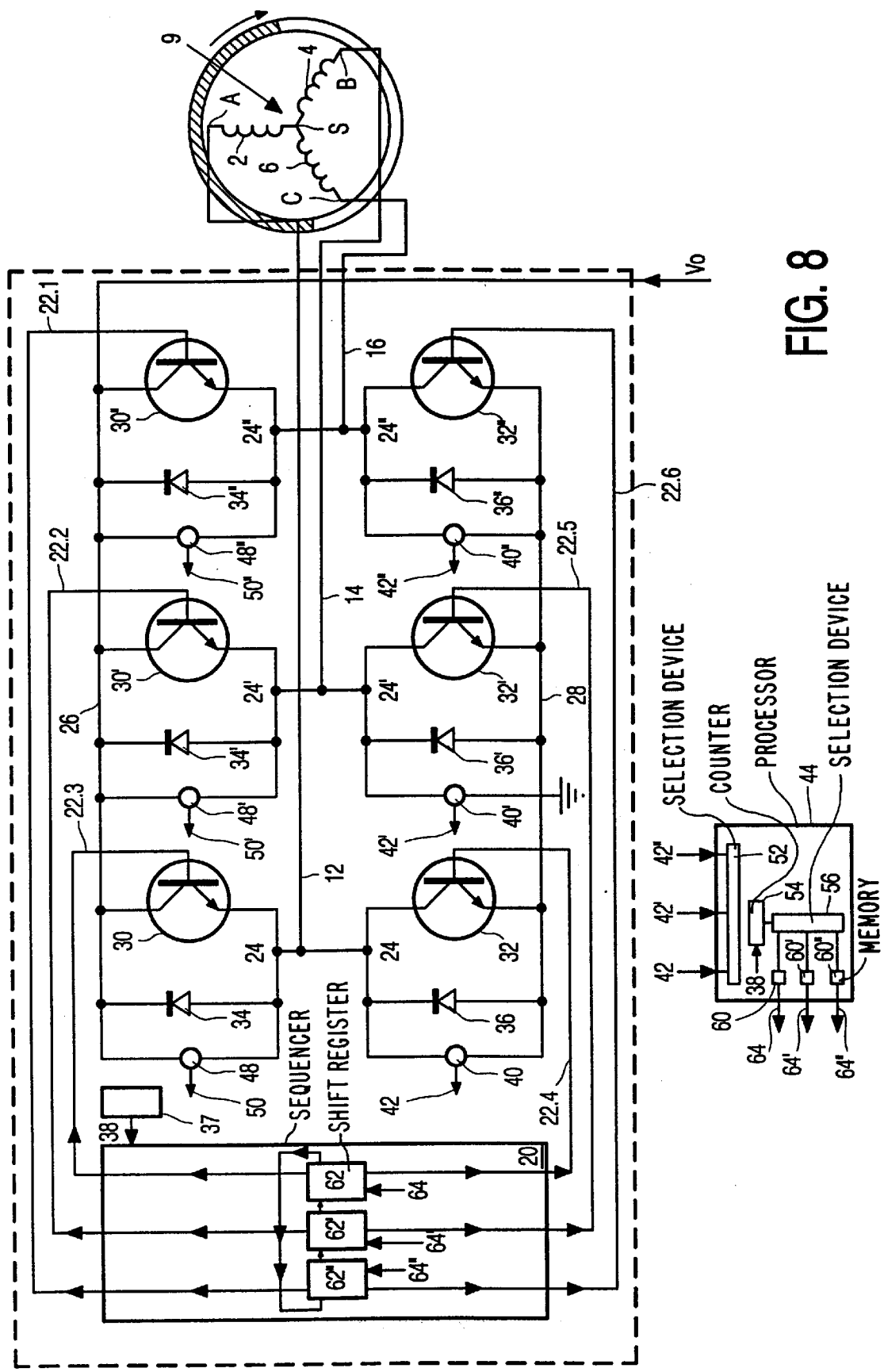
FIG. 8 shows a possible variant which is a further development of the device shown in FIG. 1.

By means of the device as shown in FIG. 8 a measurement process having three cycles is carried out in order to detect six flyback pulses. At first the first cycle will be described with reference to FIG. 5.

Figure 5:
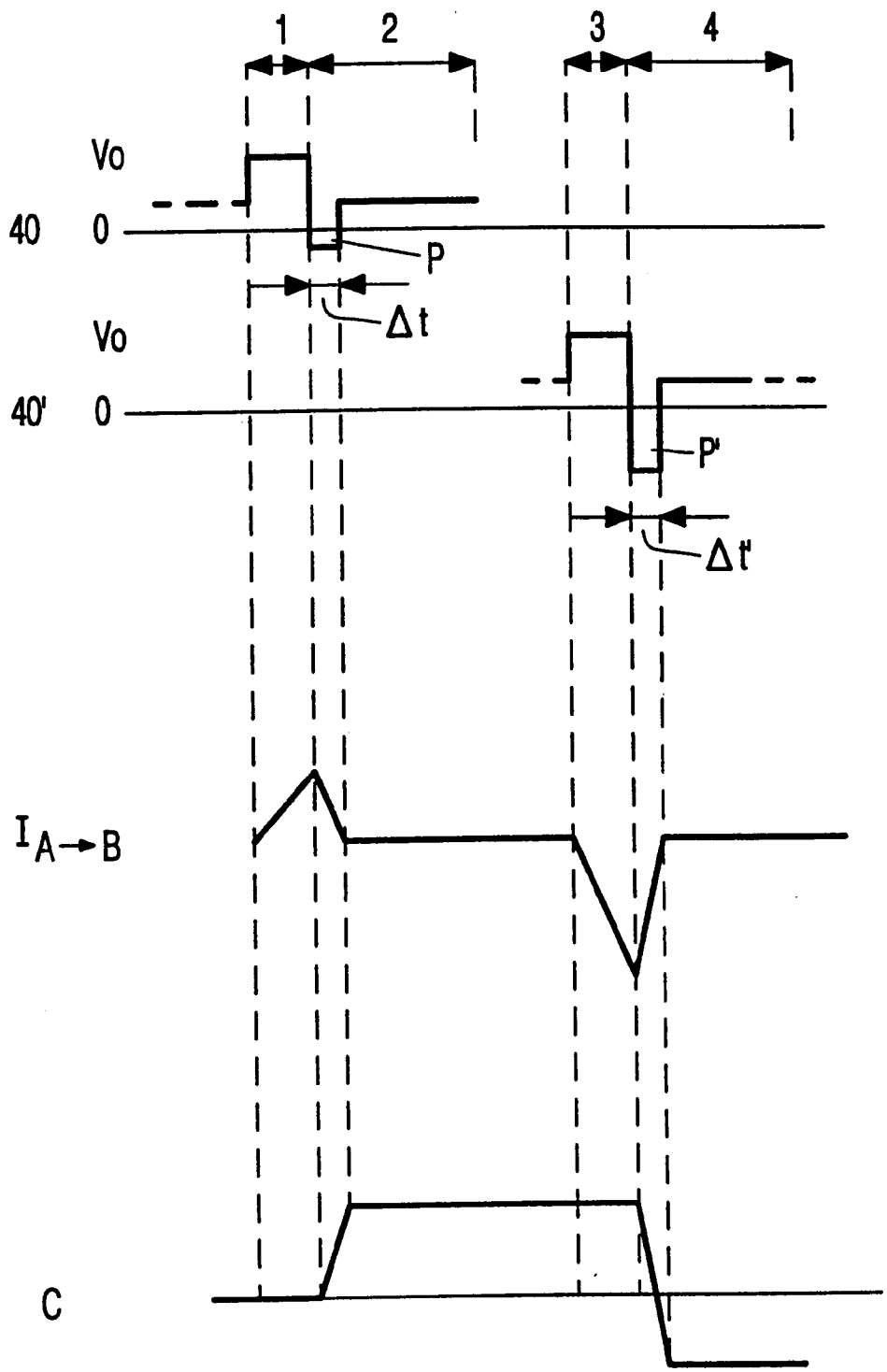
FIG. 5 shows a number of diagrams to illustrate the operation of the device shown in FIG. 1 when the device is used for determining an angle of rotation of a rotor with respect to a stator of a motor during standstill.

In a first step, indicated by the arrow 1 in FIG. 5, a first test pulse having a first polarity is applied to a first pair of windings, in the present example the windings 2 and 4. For this purpose, the switching elements 30 and 32' are closed for a predetermined period. The result is that a current begins to flow from the supply line 26 to the node A of the winding 2 through the switching element 30 via the line 12. This current proceeds to the node B of the winding 4 via the windings 2 and 4. Subsequently, the current flows from the node B of the winding 4 to the zero line 28 via the line 14 through the switching element 32'. At the end of the first step the switching elements 30 and 32" are opened again, which means that the end of the first test pulse is reached. During the first step of the cycle the monitor 40 (or the monitor 48") will detect a voltage equal to $V_0$ (see the diagram referenced 40 in FIG. 5). Moreover, the current which flows through the windings from A to B will gradually increase during the first step (see the diagram marked $I_{A->B}$ in FIG. 5).

At the end of the first step the switching elements 30 and 32' are opened again. This defines the end of the first test pulse. When the supply voltage $V_0$ across the nodes A and B of the windings 2 and 4 thus ceases a self-induction voltage will be generated in the windings 2 and 4 in response thereto. This self-induction voltage has such a polarity that in the windings 2 and 4 a self-induction current is produced which flows from A to B and which decreases as a function of time (see the diagram marked $I_{A->B}$ in FIG. 5). Said induction current thus flows from the zero line 28 to the node A via the diode 36 and via the line 12, to the node B via the windings 2 and 4, and to the supply line 26 via the line 14 and the diode 34'. Said induction current implies that a flyback pulse P is generated whose voltage is detected by means of the monitor 40 in step 2 (see the uppermost diagram in FIG. 5). It appears that the width of the flyback pulse P depends on the self-inductance of the windings 2 and 4 and thus on the angle of rotation of the rotor with respect to the stator. The detected flyback pulse is applied to the processing unit 44 via the line 42.

Upon completion of this second step, in which the flyback pulse P is measured, a second test pulse is generated in a third step of the cycle, which second test pulse has a polarity opposite to the polarity of the first test pulse. For this purpose, the switching element 30' and the switching element 32 are closed for a predetermined period in the third step, which is indicated by the arrow 3 in FIG. 5. In the step 3 this causes a current to flow from the supply line 26 to the node B of the winding 4 via the switching element 30' and via the line 14. Subsequently, the current flows from the node B to the node A through the winding 4 and the winding 2. After this, the current flows from the node A to the zero line 28 via the line 12 through the switching element 32. In the third step the voltage detected by the monitor 40' will be equal to $V_0$. Moreover, the current which flows from B to A will gradually increase during the third step. In FIG. 5 this is shown as a negative current in the diagram $I_{A->B}$, because the diagram shows the current from A to B. After the second test pulse has ceased another self-induction voltage will be generated in response in the windings 2 and 4.

Figure 7:
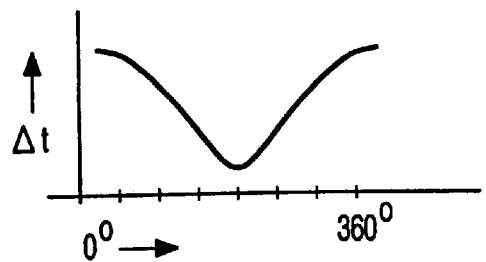
FIG. 7 is a diagram which represents the variation of the width of a flyback pulse from a winding in dependence on the angle of rotation between the stator and the rotor.

In a manner wholly similar to that described for step 2, it is now possible in a step 4 of the cycle to measure the generated flyback pulse P' with the aid of the monitor 40' (or the monitor 48), see the diagram 40' in FIG. 5. During the presence of the flyback pulse 40' the induction current through the windings 2 and 4 will again decrease slowly. The width of the flyback pulse P' is also dependent on the self-inductance and, consequently, on the angle of rotation of the rotor with respect to the stator. Since the winding 2 occupies another angular position with respect to the stator than the winding 4 the self-induction currents generated during the second and the fourth step will decrease at mutually different rates. As a result of this, the flyback pulse P will have another width Δt than the width Δt' of the flyback pulse P'. Generally speaking, as is shown in FIG. 7, the width Δt of the flyback pulse depends on the angle of rotation θ between the rotor and the stator. Since it is known that the angular difference between the winding 1 and the winding 2 is 120° it is possible to determine whether the orientation of the winding 2 is north or south on the basis of the time difference Δt–Δt'. For example, if Δt–Δt' is smaller than zero the conclusion may be drawn that the node A of the winding 2 is oriented towards a north side of the rotor. Conversely, if Δt–Δt' is greater than zero the conclusion may be drawn that the node A is oriented towards a south side of the stator.

Figure 6:
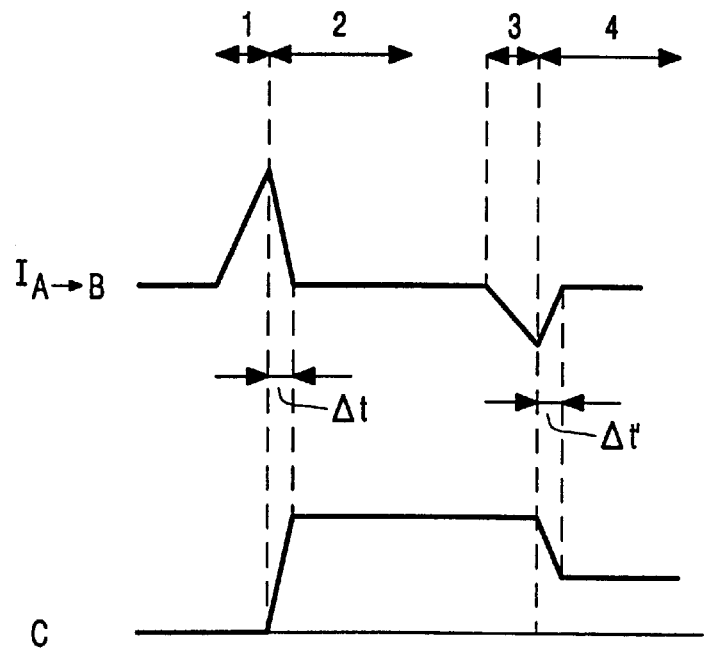
FIG. 6 shows a number of diagrams to illustrate the operation of the device shown in FIG. 1 when the device is used for determining an angle of rotation of a rotor with respect to a stator of a motor during standstill.

In the situation shown in FIG. 5 Δt is smaller than Δt', while in the situation shown in FIG. 6 Δt' is smaller than Δt. Thus, in the situation shown in FIG. 6 the node is oriented towards the south and in the situation shown in FIG. 5 the node is oriented towards the north.

Subsequently, the first cycle is repeated in a second cycle and a third cycle for a second pair of windings 4 and 6 and for a third pair of windings 6 and 2, respectively. Thus, for the second pair of windings this means, briefly summarized, that in a step 1 of the second cycle the switching elements 30' and 32" are closed and that in a step 2 of the second cycle the flyback pulse is measured by means of the monitor 40' (or the monitor 48"), that in a step 3 of the second cycle the switching element 30" and the switching element 32' are closed, and that in a step 4 of the second cycle the flyback pulse is measured with the aid of the monitor 40" (or the monitor 48'). Moreover, in a step 1 of the third cycle the switching element 30" and the switching element 32 are closed, in a step 2 of the third cycle the flyback pulse is measured by means of the monitor 40" (or the monitor 48), in a step 3 of the third cycle the switching elements 30 and 32" are closed, and in a step 4 of the third cycle the flyback pulse is measured by means of the monitor 40 (or the monitor 48"). Each of said six flyback pulses is applied to the processing unit 44 via the respective lines 42, 42' and 42". The processing unit 44 processes these flyback pulses as follows.

The first flyback pulse P, which is detected during the first cycle, is applied to a counter 54 via a selection device 52 of the processing unit 44. In the present example the counter 54 is clocked by the signal on the line 38. The counter 54 counts the number of pulses applied via the line 38 as long as the flyback pulse P of the first cycle is present. Subsequently, during the step 4 of the first cycle the flyback pulse P' detected by the monitor 40' is applied to the counter 54 via the selection device. During this period the counter counts down in the rhythm of the clock signal applied via the line 38. The count C of the counter 54 is also indicated in FIG. 5. At the end of the fourth step of the first cycle the count has a negative value, which means that the node A of the winding 2 is oriented towards a north side of the stator. The count (positive or negative) of the counter C is stored in a first memory 60 via a selection device 56 of the processing unit 44.

In a wholly similar manner the difference in the durations of the flyback pulse P and the flyback pulse P' of the pair of windings 4 and 6 is determined by means of the counter 54 in the second cycle. The count of the counter 54 is stored in a memory 60' at the end of the fourth step of the second cycle. Moreover, in a wholly similar manner, the difference in the durations of the flyback pulses generated during the third cycle is determined and is stored in the memory 60".

In the device shown in FIG. 8 the sequencer comprises a plurality of shift registers 62, 62', 62" arranged in series with one another in a closed loop. The contents of the shift register 62 defines the switching states of the switching elements 30 and 32 via lines 22.4 and 22.3. Likewise, the contents of the shift register 62' defines the switching states of the switching elements 30' and 32'. The contents of the shift register 62" defines the switching states of the switching elements 30" and 32".

When the afore-mentioned three cycles have been completed the contents of the memory 60 is applied to the shift register 62 via a line 64. In a fully similar manner, the contents of the memory 60' is applied to the shift register 62' via a line 64'. Moreover, the contents of the memory 60" is applied to the shift register 62" via a line 64". The shift registers are then loaded in such a manner with respect to one another that the rotor is set into rotation in a predetermined given direction when the drive means 11 are activated in order to generate drive signals. In general, the width of the test pulses will then be smaller than the width of the drive pulses of the drive signal.

It is to be noted that the invention is in no way limited to the embodiments described hereinbefore.

For example, instead of by means of the monitors 40, 40', 40" the flyback pulses can likewise be detected by means of the monitors 48, 48', 48". Moreover, it is alternatively possible to form the sequencer in another manner than by means of the afore-mentioned shift registers.

Furthermore, the aforementioned three cycles can also be configured in another manner, as will be described with reference to FIG. 9.

Figure 9:
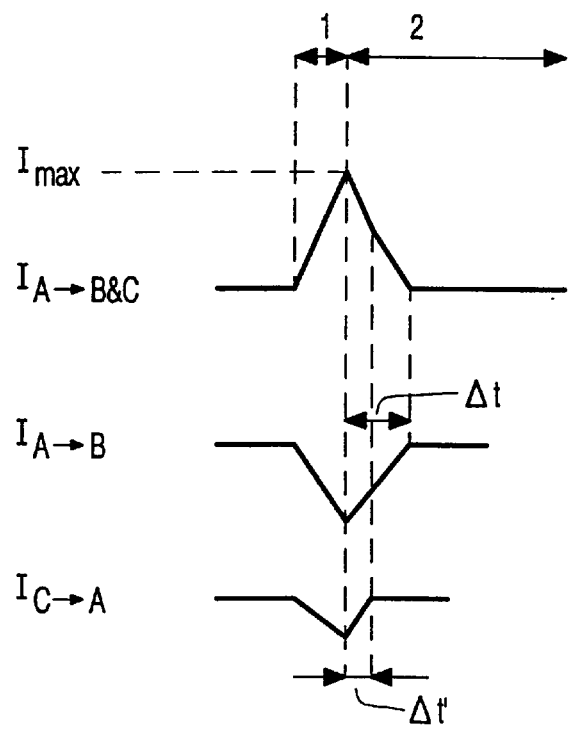
FIG. 9 shows a number of diagrams to illustrate an alternative method of operation of the device shown in FIG. 1 for determining an angle of rotation of a rotor with respect to a stator.

FIG. 9 shows a first cycle of the alternative measurement method that can be carried out by means of the device as shown in FIG. 1. In this first cycle a first test pulse is applied to the windings in such a manner that the current of the first test pulse flows wholly through the winding 2 and subsequently divides between the windings 4 and 6. The current which flows through the winding 2 is marked $I_{A->B\&C}$ in FIG. 9. The current which flows through the winding 4 from B to A is marked $I_{B->A}$ in FIG. 9. Finally, the current which flows through the winding 6 from C to A is marked $I_{C->A}$ in FIG. 9. For thus applying the test pulse to the windings 2, 4, 6 the switching elements 30, 32' and 32" are closed in the step 1 of the first cycle. At the end of the step 1 the current supply is stopped. For this purpose, the switching elements 32' and 32" and, if required, also the switching element 30 are opened again. As a result of this, a flyback pulse is generated both by the combination of windings 2 and 4 and by the combination of windings 2 and 6. Thus, two different flyback pulses are generated in response to the first test pulse. The current through the winding 4, corresponding to the first flyback pulse, is sustained for a time Δt. This flyback pulse consequently has a width equal to Δt (see FIG. 9). The current of the flyback pulse through the winding 6 is sustained for a time Δt'. The flyback pulse corresponding to the winding 6 consequently has a width equal to Δt' (see FIG. 9). The flyback pulses thus generated can again be measured by means of the monitors 40, 40', 40" and can be applied to the processing unit 44. In an entirely similar manner the first cycle is repeated in a second cycle and a third cycle respectively for a second test pulse whose current flows wholly through the second winding and, divided between the first and the third winding, through the first and the third winding, and a third pulse whose current flows wholly through the third winding and, divided between the first and the second winding, through the first and the second winding. Thus, also in the second cycle two flyback pulse are generated, which pulses are detected by means of the monitors 40, 40', 40" and applied to the processing unit 44. Likewise, the flyback pulses generated in the third cycle are detected and applied to the processing unit 44. The processing unit determines which of the two flyback pulses corresponding to the first cycle is longer. For the first cycle the first flyback pulse has a longer duration than the second flyback pulse when the node A is oriented to the magnetic north of the stator. The situation is the other way around when the node A of the winding 2 is oriented towards a magnetic south. This applies in a wholly analogous manner to the second and the third cycle in relation to the second winding 4 and the third winding 6. Thus, it is determined for each node A, B and C whether it is oriented towards a magnetic north or south. Subsequently, the rotational position of the rotor with respect to the stator can be determined on the basis of these three facts with an accuracy of 60°.

In the example of FIG. 9 a test pulse can have a predetermined length. However, it is alternatively possible that the test pulse has such a length that the current value of the test pulse increases to a predetermined maximum value $I_{MAX}$, as is shown in FIG. 9.

Obviously, the invention can also be applied to n-phase d.c. motors for which n is greater than 3. In that case it is possible to generate, for example, two times n flyback pulses in order to determine the angle of rotation with an accuracy of 180°/n.

Figure 10:
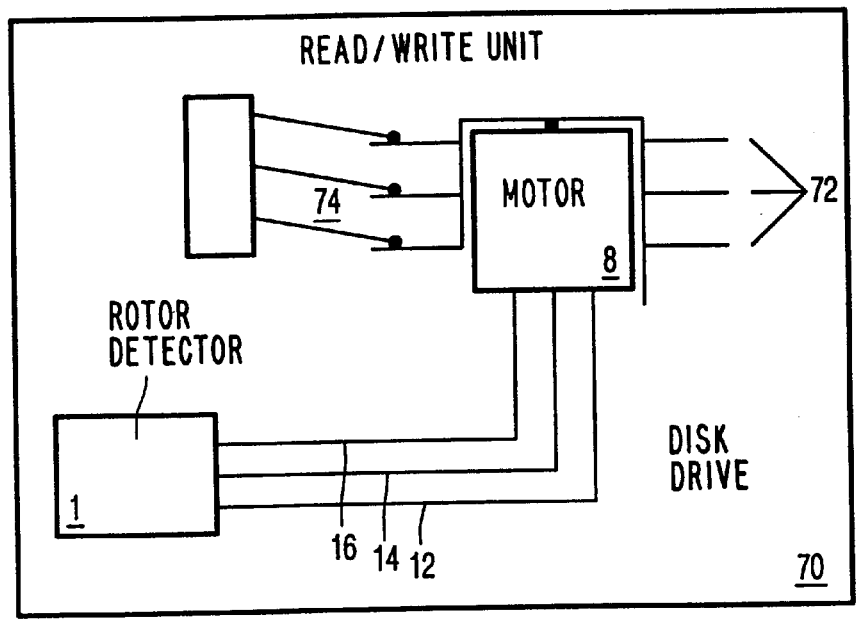
FIG. 10 shows a disk drive including a device in accordance with the invention.

FIG. 10 shows a possible embodiment of a disk drive 70. The disk drive 70 comprises an information carrier in the form of an assembly of, in the present example, three magnetizable disks 72. The disk drive further includes a read and write unit 74 for writing digital information onto the rotatable disks 72 and reading digital information from the disks 72. The rotatable disks 72 are driven by the device 1 and the motor 8 shown in FIG. 1. The advantage of the disk drive 70 is that the start-up of the disk drive 72 is very reliable. What is meant by this is that there is no risk that the disk drive 70 is inadvertently started in an undesired direction of rotation, while nevertheless the disk drive will start up very rapidly.

Figure 11:
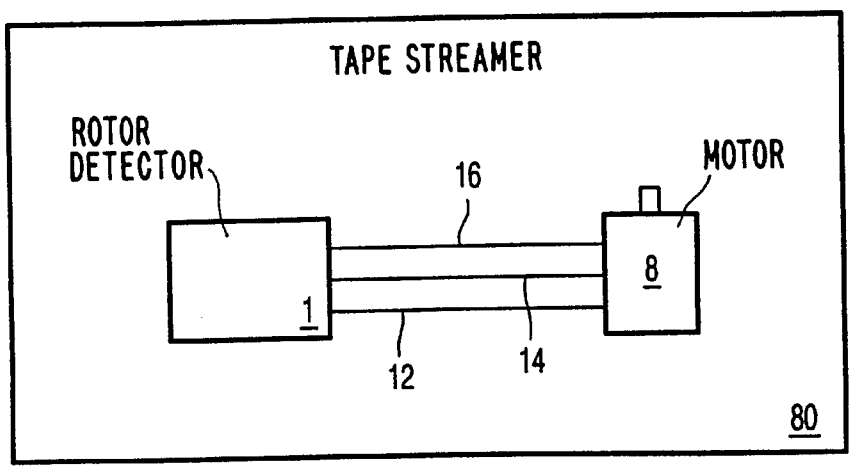
FIG. 11 shows a tape streamer including a device in accordance with the invention.

The device 1 in accordance with the invention can also be used with advantage in a tape streamer 80 having a multi-phase d.c. motor 8 (FIG. 11) for driving a tape (not shown). The advantage is that upon starting the d.c. motor cannot temporarily rotate in an undesired direction, as a result of which a part of the storage capacity of the tape cannot be used or be lost.

Furthermore, it is to be noted that on the basis of the inventive concept other measurement methods can be used in order to determine the angle of rotation of a rotor with respect to a stator on the basis of the widths of the flyback pulses. Thus, it is possible to determine for an arbitrary first winding of a four-phase d.c. motor whether this winding is oriented towards the magnetic north or the magnetic south. Subsequently, it can be examined for an adjacent second winding whether the magnetic orientation is displaced with respect to that of the first winding. If this is the case, a similar measurement process can be employed for a third winding etc.

Such variants are each considered to fall within the scope of the invention.

What is claimed is:

1. A device for detecting an angle of rotation of a permanent magnet rotor with respect to a stator of a brushless multi-phase d.c. motor in which the stator includes a plurality of electrical windings to which, in operation, electric drive signals are applied for driving the rotor, the device comprising: drive means for applying electric test pulses to the windings while the rotor does not rotate, a measurement circuit for detecting flyback pulses generated by the motor in response to the test pulses, and a processing unit which processes the durations of the detected flyback pulses in combination in order to determine said angle of rotation.

2. A device as claimed in claim 1, wherein the drive means are also adapted to recurrently apply drive signals to the windings of the stator in a given sequence in order to rotate the rotor.

3. A device as claimed in claim 2, wherein the drive means include a plurality of switching elements for the generation of the test pulses and the drive signals, the drive means also including said measurement circuit for monitoring, during the period in which the drive means generate the drive signals, the voltages across the switching elements of the drive means when said switching elements are in an open state.

4. A device as claimed in claim 2, wherein the drive signals comprise drive pulses, the duration of the test pulses being shorter than the duration of the drive pulses.

5. A device as claimed in claim 1, wherein the drive means are adapted to apply test pulses to each of the windings.

6. A device as claimed in claim 5, wherein two test pulses of mutually different polarities are applied to each of the windings.

7. A device as claimed in claim 6, wherein is adapted to a motor having three windings (n=3) arranged with a mutually different phase with respect to one another, the device for determining the angle of rotation performing, in operation, a measurement process comprising three cycles in order to detect six flyback pulses, a first test pulse of a first polarity being applied to a first pair of windings in a first cycle; a flyback pulse generated in response to the first test pulse being detected; a second test pulse of a second polarity opposite to the first polarity being applied to the first pair of windings; and a flyback pulse generated in response to the second test pulse being detected; the first cycle being repeated in a second cycle and in a third cycle for a second pair of windings and a third pair of windings, respectively, the first, the second and the third pair of windings being different from one another.

8. A device as claimed in claim 7, wherein in each cycle the difference between the durations of two flyback pulses measured in the respective cycle is measured with the aid of the processing unit.

9. A device as claimed in claim 8, wherein the processing unit includes an up-down counter for determining the difference in duration of said two flyback pulses.

10. A device as claimed in claim 3, wherein the processing unit includes an up-down counter for determining the difference in duration of two successive flyback pulses and the drive means comprise a plurality of shift registers arranged in series with one another in a closed loop for opening and closing the switching elements in response to the contents of the shift registers in order to generate the drive signals, the values of the difference in duration determined by means of the up-down counter being applied, in operation, to the shift registers for determining the initial state of the shift registers such that, when the motor is started, the rotor is set into rotation in a predetermined direction.

11. A device as claimed in claim 7, wherein the test pulses have a fixed duration.

12. A device as claimed in claim 1 which is adapted to a motor having three windings (n=3) arranged with a mutually different phase with respect to one another, wherein the drive means apply two test pulses of mutually different polarities to each of the windings, the device for determining the angle of rotation performing, in operation, a measurement process comprising three cycles in order to detect the durations of six flyback pulses, a first test pulse being applied to the windings in a first cycle in such a manner that the first test pulse flows wholly through a first winding and is divided to flow through the second and the third winding; at least two flyback pulses generated in response to the first test pulse being detected by the measurement circuit; and the processing unit determining which of the two flyback pulses has the longer duration; the first cycle being repeated in a second and a third cycle, respectively for a second test pulse which flows wholly through the second winding and is divided to flow through the first and the third winding, and a third test pulse which flows wholly through the third winding and is divided to flow through the first and the second winding.

13. A device as claimed in claim 12, wherein the test pulses have a fixed duration.

14. A device as claimed in claim 12, wherein the drive means control the durations of the test pulses in a manner such that the current amplitude of the test pulses increases to a predetermined maximum value.

15. A drive system comprising: a multi-phase d.c. motor having a permanent magnet rotor and a stator which includes a plurality of windings, and a device for detecting an angle of rotation of the rotor with respect to the stator, the detecting device comprising;

drive means for applying electric test pulses to the windings while the rotor does not rotate, a measurement circuit for detecting flyback pulses generated by the motor in response to the test pulses, and a processing unit which processes the durations of the detected flyback pulses in combination in order to determine said angle of rotation.

16. A drive system as claimed in claim 15 further comprising at least one magnetizable disk driven by the multi-phase d.c. motor.

17. In a brushless multi-phase d.c. motor having a permanent magnet rotor and a stator with multiple windings, a method for determining the position of the rotor with respect to the stator while the rotor is at standstill, comprising:

applying short duration electric test pulses to the windings without rotation of the rotor, detecting flyback pulses generated in the stator windings in response to said test pulses, processing detected flyback pulses in combination on the basis of the durations thereof so as to determine the rotor position relative to the stator, and applying recurrent drive signals to the stator windings in a given sequence to rotate the rotor in a predetermined direction of rotation on the basis of the determined rotor position.

18. The position determining method as claimed in claim 17 wherein, during a first cycle a first test pulse of a first polarity is applied to a first pair of stator windings and a first flyback pulse generated in response thereto is detected, applying a second test pulse of a second polarity opposite to the first polarity to the first pair of stator windings during the first cycle, detecting a second flyback pulse generated in response thereto, the difference in durations of the first and second flyback pulses serving as part of the criteria for determining the rotor position, and repeating the first cycle in a second cycle for a second different pair of the stator windings wherein the difference in durations of third and fourth flyback pulses generated in the second cycle serve as a further part of the criteria for determining the rotor position.

19. The position determining method as claimed in claim 17 wherein the test pulses have a fixed duration.

20. The position determining method as claimed in claim 17 wherein, during a first cycle a first test pulse is applied to the stator windings which test pulse flows entirely through a first stator winding and divides so as to flow through second and third stator windings whereby first and second flyback pulses are generated in response thereto and are detected, wherein the processing step determines which of the first and second flyback pulses has the longer duration, and repeating the first cycle in second and third cycles for second and third test pulses, respectively, wherein the second test pulse flows entirely through the second stator winding and divides so as to flow through the first and third stator windings whereby third and fourth flyback pulse are generated in response thereto and are detected, and the third test pulse flows entirely through the third stator winding and divides so as to flow through the first and second stator windings whereby fifth and sixth flyback pulses are generated in response thereto and are detected.

21. The position determining method as claimed in claim 20 wherein the test pulses have a fixed duration.

* * * * *